United States Patent [19]

Numazawa et al.

[11] 4,263,823
[45] Apr. 28, 1981

[54] COMPACT TRANSMISSION FOR USE IN AUTOMOBILES HAVING MEANS FOR COUNTERBALANCING INTERNAL THRUSTS

[75] Inventors: Akio Numazawa, Nagoya; Seitoku Kubo, Toyota; Koujiro Kuramochi, Toyota; Tatsuo Kyushima, Toyota, all of Japan

[73] Assignee: Toyota Jidosha Kogyo Kabushiki Kaisha, Toyota, Japan

[21] Appl. No.: 18,277

[22] Filed: Mar. 7, 1979

[30] Foreign Application Priority Data

May 19, 1978 [JP] Japan .................................. 53-58824

[51] Int. Cl.³ ............................................. F16H 37/08
[52] U.S. Cl. ...................................................... 74/695
[58] Field of Search ................... 74/695, 410, 753, 765

[56] References Cited

U.S. PATENT DOCUMENTS

| | | | |
|---|---|---|---|
| 3,102,433 | 9/1963 | Stoeckicht | 74/401 |
| 3,499,037 | 1/1970 | Mori et al. | 74/695 |
| 3,685,368 | 8/1972 | Thoma | 74/410 |

FOREIGN PATENT DOCUMENTS

| | | | |
|---|---|---|---|
| 1131061 | 6/1962 | Fed. Rep. of Germany | 74/753 |
| 1965530 | 7/1971 | Fed. Rep. of Germany | 74/753 |
| 1198074 | 7/1970 | United Kingdom | 74/753 |

*Primary Examiner*—Werner H. Schroeder
*Attorney, Agent, or Firm*—Finnegan, Henerson, Farabow, Garrett & Dunner

[57] ABSTRACT

A vehicular transmission including an underdrive unit and an overdrive unit each having at least one planetary gear system including a sun gear, ring gear, planetary pinions and planetary carrier wherein an axial extension member integral with the output gear of the underdrive unit and an axial extension member integral with the input gear of the overdrive unit are axially engaged to counterbalance the thrusts of the planetary gear systems. The transmission also includes structures within the overdrive planetary gear system and between the overdrive planetary gear system and gear transmitting output of the overdrive unit to the vehicle wheels for counterbalancing their respective thrusts.

20 Claims, 3 Drawing Figures

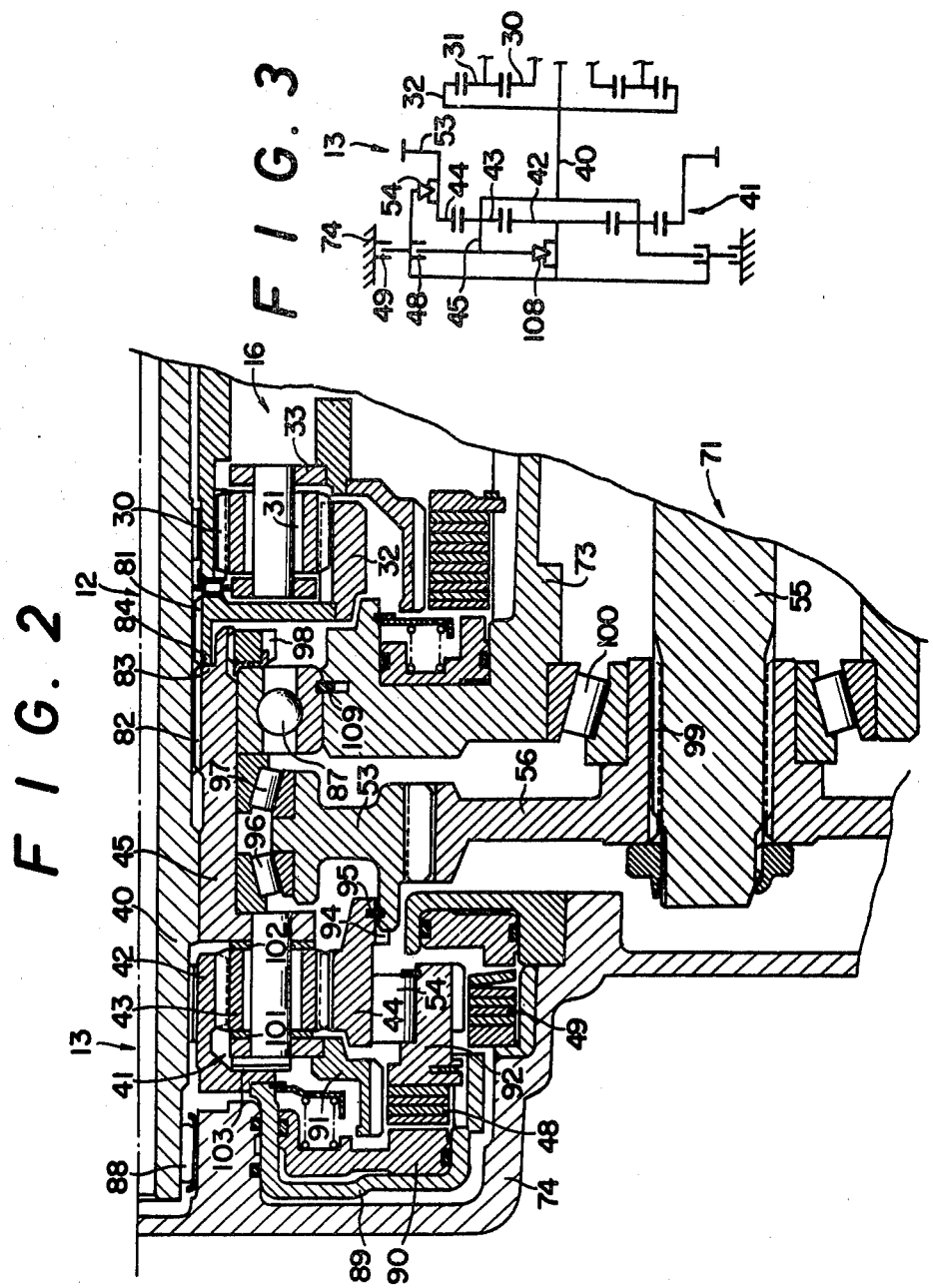

COMPACT TRANSMISSION FOR USE IN AUTOMOBILES HAVING MEANS FOR COUNTERBALANCING INTERNAL THRUSTS

BACKGROUND OF THE INVENTION

1. Field of the Invention

This invention relates to a transmission for use in automobiles, and more particularly to a transmission for use in front-wheel drive or rear-wheel drive automobiles with an engine transversely mounted therein, wherein an automatic speed change gear and a final reduction gear are incorporated in combination.

2. Description of the Prior Art

With a view to affording an automobile increased space, automobiles having front-engine, front-wheel or rear engine, rear-wheel driving systems have become recently popular. Such automobiles have many advantages, such as compactness in size, reduction in weight and reduction in fuel consumption.

If an automatic speed change gear providing four forward speed range drives and one reverse drive is incorporated in the transmission for use with a front-wheel drive automobile having a laterally mounted engine, in order to reduce fuel consumption and to reduce noise, the overall length of the transmission increases and may interfere with the suspension of the automobile. This presents a serious problem, particularly in so-called compact cars.

To cope with such a problem, a compact transmission for use in an automobile has been developed providing an automatic speed change gear with at least four forward speed range drives and a reverse drive which does not interfere with the suspension device of the automobile. Such transmissions are generally disclosed in U.S. Pat. Nos. 4,056,988 and 4,063,468.

In such a transmission, the first two forward speed ranges and reverse are considered an underdrive unit and the third and fourth forward speed range are considered an overdrive unit, each unit being contained in a separate case. The thrust forces acting on the overdrive unit and underdrive unit are each received by the respective cases through bearings. In a transmission using such bearings, where thrusts act in the same direction, the sum of the thrusts act on the bearings and cases. Such forces largely develop during stall conditions. These forces lead to a shortened service life of bearings and an accelerated deformation of the cases.

SUMMARY OF THE INVENTION

It is an object of the present invention to provide a transmission for use in automobiles wherein bearings do not suffer damage and the cases resist deformation, as a result of a counterbalancing of internal thrusts of the overdrive and underdrive units.

In accordance with the invention, a vehicular transmission having an underdrive unit and an overdrive unit, the former driving and being coaxial with the latter and each such unit including at least one planetary gear system having sun and ring gears, planetary pinions and a planetary carrier comprises a first means integral with and interacting between the under-drive and overdrive units for counterbalancing the thrusts of the planetary gear systems of those units.

Preferably, a first counterbalancing means is an axial extension member on the output driving element of the underdrive unit and an axial extension member on the input driven element of the overdrive unit, the extension members being axially engageable to counterbalance the thrusts transmitted by the elements.

It is also preferred that the transmission include a second means axially disposed between and engaging the input driven element and a second element of the overdrive unit for counterbalancing the thrust of the second element and the thrust of the underdrive unit conveyed through the driven element. This second counterbalancing means may be a washer member axially disposed between the sun gear and planetary carrier of the planetary system in the overdrive unit.

Additionally, it may be desirable to include a third means of counterbalancing the thrust of the output element of the over-drive unit planetary system and the gear means for transmitting the rotation of the overdrive unit to the wheels of the vehicle. Preferably, the output element is the ring gear of the overdrive planetary system operatively coupled with an output gear axially disposed between the overdrive and underdrive units, and the third means of thrust counterbalancing is a stopper ring transversely engaging the coupled peripheral surfaces of the overdrive ring gear and the output gear.

In accordance with the invention, a compact transmission for an engine driven vehicle, the crank shaft of the engine driving the transmission and the output of the transmission driving the wheels of the vehicle, comprises a fluid-type torque converter coaxial with and driven by the crank shaft of the engine and an underdrive unit having an axial input shaft coaxially connected to and driven by the torque converter. The underdrive unit comprises a planetary gear system including an input gear means driven by the input shaft and an output gear means and an intermediate shaft connected to and driven by the underdrive output gear means. Also included is an overdrive unit comprising a planetary gear system including an input gear means and an output gear means, the input gear means being coaxially connected to and driven by the intermediate shaft. Axial extension member means integral with the underdrive output gear means and with the overdrive input gear means place the underdrive output and overdrive input gear means in axial engageable contact to counterbalance the thrusts of the planetary gear systems. Washer means are axially disposed between the overdrive input gear means and another element of the overdrive planetary system for counterbalancing the thrust of the overdrive planetary system against the thrust of the underdrive planetary system conveyed through the extension member means and the overdrive input gear means. Gear means operatively coupled with the output gear means of the overdrive unit transmit the output of the overdrive unit to the wheels of the vehicle and a stopper ring transversely engages the coupled peripheral surfaces of the overdrive output gear means and gear means driving the vehicle wheels for counterbalancing the respective thrusts.

Preferably, the underdrive unit has two or more reduction gear ratios having a value equal to or greater than one and the overdrive unit has two or more reduction gear ratios having a value equal to or less than one.

The accompanying drawings, which are incorporated in and constitute part of this specification, illustrate embodiments of the invention and, together with the description, serve to explain the principles of the invention.

BRIEF DESCRIPTION OF THE DRAWINGS

FIG. 2 is a partial view in longitudinal cross-section of the detailed construction of the bottom half of the transmission according to the schematic in FIG. 1;

FIG. 3 is a schematic diagram of another embodiment of the present invention.

DESCRIPTION OF PREFERRED EMBODIMENTS

Figure 1:
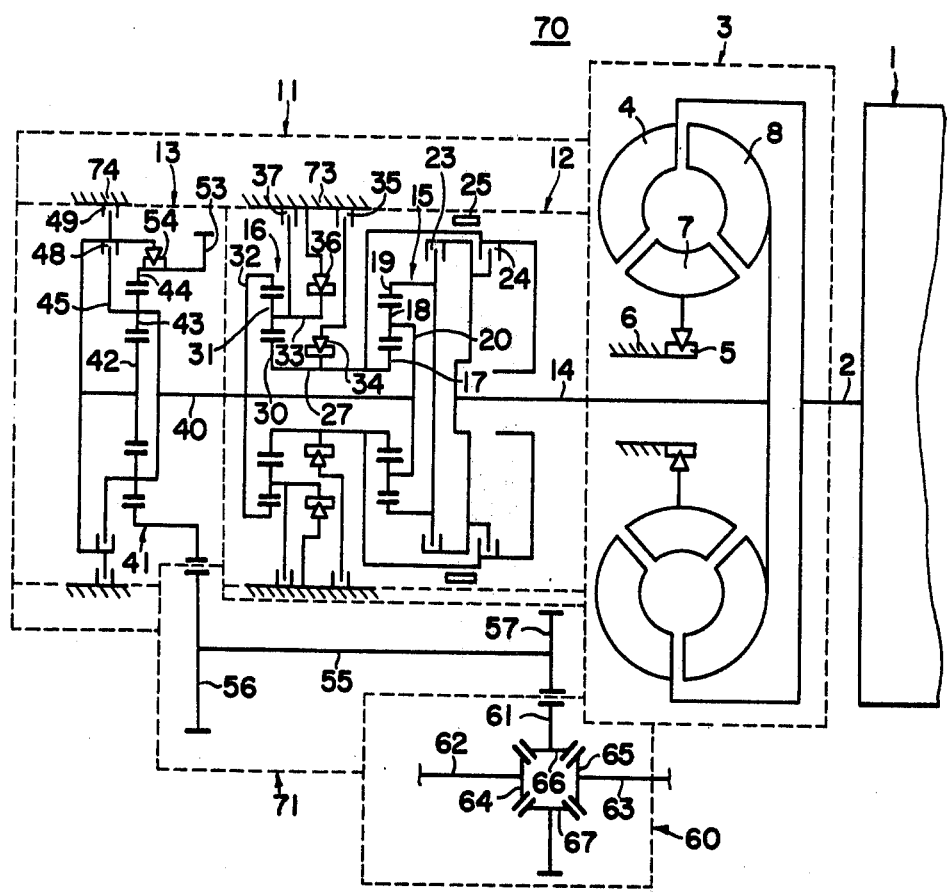
FIG. 1 is a schematic diagram showing the transmission according to the present invention.

FIG. 1 schematically represents an engine and transmission wherein an internal combustion engine 1 is mounted transversely as to the vehicle parallel to the axles of an automobile between two wheels (not shown). The wheels may be the front wheels or the rear wheels. A crank shaft 2 of engine 1 is operatively connected to an automatic speed change gear 70 of the transmission. The transmission comprises automatic speed change gear 70 and a final reduction gear 60. Automatic speed change gear 70 includes a fluid type torque converter 3, an auxiliary speed change gear 11 and a transmission unit 71, and is attached to the engine laterally of the automobile. Fluid type torque converter 3 is a known structure, including a pump impeller 4 coupled to crank shaft 2, a stator 7 operatively connected by way of a one-way clutch 5 to a stationary portion 6, and a turbine runner 8.

Auxiliary speed change gear 11 includes an underdrive unit 12 and an overdrive unit 13 which are coaxial with crank shaft 2. Underdrive unit 12 has an input shaft 14 which extends in the axial direction of crank shaft 2 and is operatively connected to turbine runner 8. Underdrive unit 12 has first and second planetary gear systems 15 and 16. First planetary gear system 15 includes a sun gear 17, a planetary pinion 18, a ring gear 19 and a planetary carrier 20 rotatably supporting planetary pinion 18.

A clutch unit 23 controls the driving relationship of input shaft 14 with ring gear 19, and a clutch unit 24 controls the driving relationship of input shaft 14 with a sun gear shaft 27 coupled to sun gear 17. A brake unit 25 governs the driving relationship of sun gear 17 with fixed drive case 73. The ring gear 19 and the sun gear 17 of the first planetary system, separately or in combination, selectively comprise the input gear means of the underdrive unit 12.

Second planetary gear system 16 includes a sun gear 30, planetary pinions 31, a ring gear 32 and a planetary carrier 33 rotatably supporting planetary pinion 31. Sun gear 30 is operatively connected to sun gear shaft 27. A one-way clutch 34 and a brake unit 35 are disposed in series relation to each other between sun gear shaft 27 and drive case 73. A one-way clutch 36 and a brake unit 37 are disposed in parallel relation to each other between carrier 33 and drive case 73. One-way clutches 34 and 36 are coaxial and in a superposed relation to each other as viewed in the axial direction.

An intermediate shaft 40 extending centrally of auxiliary speed change gear 11 is coaxial with input shaft 14 and operatively connected to planetary carrier 20 and ring gear 32, so as to transmit a driving force from underdrive unit 12 to overdrive unit 13. Planetary carrier 20 of the first planetary system 15, ring gear 32 of the second planetary system 16 and intermediate shaft 40 constitute the output gear means of the underdrive unit 12.

Overdrive unit 13 includes a planetary gear system 41. Planetary gear system 41 includes a sun gear 42, planetary pinions 43, a ring gear 44 and a planetary carrier 45 rotatably supporting planetary pinions 43. Carrier 45 is operatively connected to intermediate shaft 40 and constitutes the input gear means of the overdrive unit 13. A clutch unit 48 controls the driving relationship of carrier 45 with sun gear 42, and a brake unit 49 controls the driving relationship of sun gear 42 with auxiliary case 74. Ring gear 44 of planetary gear system 41 is the output gear means of the overdrive unit 13.

Ring gear 44 is operatively coupled to output gear 53, axially interposed between overdrive unit 13 and underdrive unit 12. A one-way clutch 54 controls the driving relationship of sun gear 42 with ring gear 44 and output gear 53.

Transmission output unit 71 includes a transmission output shaft 55 extending substantially parallel to the intermediate shaft 40 and having at one end a driven gear 56 meshing with output gear 53 and at the other end a driving gear 57.

Final reduction gear 60 is positioned substantially at the midportion in the transverse direction of a vehicle, and driving gear 57 is positioned near to torque converter 3, rather than to driven gear 56. Driving gear 57 meshes with a gear 61 of final reduction gear 60. Output gear 53, transmission output unit 71 and final reduction gear 60 constitute gear means for transmitting the output of the overdrive unit 13 to the wheels of the vehicle.

Final reduction gear 60 is of a known structure, wherein left and right axle shafts 62 and 63 extend from side gears 64 and 65 in parallel to the axis of auxiliary speed change gear 11. Left and right axle shafts 62 and 63 are operatively connected to left and right wheels (not shown). Shafts which support pinions 66 and 67 rotatably are rotated along with gear 61, which shafts mesh with side gears 64 and 65, respectively.

Operation of the auxiliary speed change gear will be described with reference to the following table.

TABLE

| Speed range | 23 | 24 | 25 | 35 | 37 | 34 | 36 | 48 | 49 | 54 |
|---|---|---|---|---|---|---|---|---|---|---|
| First speed | O | | | | O | Δ | O | | | Δ |
| Second speed | O | | O | O | | Δ | O | | | Δ |
| Third speed | O | O | | | | | | O | | Δ |
| Over-drive | O | O | | | | | | | O | |
| Reverse | | O | | | O | | | O | | Δ |

In this table, numerical figures represent clutches, brakes and one-way clutches shown; a circle ( O ) represents engaged clutches and brakes and a triangle (Δ) represents engaged one-way clutches when the engine is running. Engagement and disengagement of each clutch and brake are conventionally controlled by supply of an oil pressure from an oil pressure control device through an oil pressure servo mechanism. In the first and second speed range drives, one-way clutches 36 and 34 are maintained in an engaged position, thereby accomplishing the first and second speed drives. At the low speed range drive and the second speed range drive, brakes 37 and 25 are brought into engagement by supply of an oil pressure, whereby the first and second speed drives are maintained.

FIG. 2 shows in detail a preferred embodiment of the present invention. In the underdrive unit 12, the output means or output driving element at the reverse drive is the ring gear 32 of planetary gear system 16 positioned nearer to overdrive unit 13 than another planetary gear system 15 (FIG. 1).

In accordance with the invention, there is provided an improvement to the vehicular transmission which includes a first means integral with and interacting between the underdrive and overdrive units for counterbalancing the thrusts of the planetary gear systems of the units.

As embodied herein, ring gear 32 has an axial extension member 84 extending axially along the outer periphery of intermediate shaft 40 of underdrive unit 12 which serves as an output means thereof, and the inner peripheral surface of the member 84 is formed with splines 81, which in turn are fitted in outer peripheral splines of intermediate shaft 40. Carrier 45 of planetary gear system 41 is the input driven element or input means of overdrive unit 13 and has an axial extension member 83 extending axially along the outer peripheral surface of intermediate shaft 40. Member 83 is provided with splines 82 on the inner peripheral surface, which in turn are fitted in the outer peripheral splines of intermediate shaft 40. The end of member 84 and the end of member 83 are positioned in opposing relation to each other on the outer peripheral surface of intermediate shaft 40 in a manner to be engageable with each other. Intermediate shaft 40 and carrier 45 are supported by drive case 73 and overdrive case 74 through the medium of a ball bearing 87 and a needle bearing 88, respectively.

Overdrive unit 13 includes planetary gear system 41, multiple disc clutch 48, multiple brake 49 and one-way clutch 54. Multiple disc clutch 48 is disposed between carrier 45 which is an input means or driven element of overdrive unit 13 and sun gear 42 which is another, reacting force element thereof; multiple disc brake 49 is provided between sun gear 42 and overdrive case 74; and one-way clutch 54 is disposed between sun gear 42 and ring gear 44 which is an output element of overdrive unit 13. A cylindrical drum 89 of multiple disc clutch 48 is operatively connected at the radially inner end thereof to sun gear 42, and houses therein a piston 90. A clutch hub 91 of multiple disc clutch 48 is operatively connected to carrier 45.

A second counterbalancing means is axially disposed between and engages the input driven element of the overdrive unit and another element of the overdrive unit planetary system. As embodied herein, the second counterbalancing means is washer 103 provided between sun gear 42, another element of the overdrive unit 13, and carrier 45, the input driven element of the overdrive unit 13.

Washers 101 and 102 are provided at the axially opposite ends of pinion gear 43, with one washer 102 interposed between pinion gear 43 and carrier 45. A hub 92 of multiple disc brake 49 is operatively connected through the medium of cylindrical drum 89 to sun gear 45. One-way clutch 54 is positioned between ring gear 44 and hub 92, in a manner that the ring gear is used as an inner race and the hub is used as an outer race.

A third counterbalancing means counterbalances the thrust and restricts axial movement of the output element of the overdrive unit and an element of the means for transmitting the overdrive unit rotation to the vehicle wheels.

As shown in FIG. 2, output gear 53, an element of the transmitting means, is disposed between underdrive unit 12 and overdrive unit 13, as viewed in the axial direction. Ring gear 44 of planetary gear system 41 serves as the output element of overdrive unit 13 and has a portion formed with splines 94. Ring gear 44 is coupled by means of splines 94 to output gear 53. As here embodied, the third counterbalancing means is stopper ring 95 which transversely engages the coupled peripheral surfaces of ring gear 44 and output gear 53 and restricts the relative movement in the axial direction of ring gear 44 to output gear 53.

Output gear 53 is supported through the medium of bearings 96 and 97 on carrier 45, which bearings are fixed by a nut 98 to carrier 45 through the medium of a bearing 97, so that these bearings are restricted in the axial movement thereof. Transmission unit 71, part of the transmitting means, includes driven gear 56 spline-fitted to transmission unit shaft 55 at a portion 99 thereof. Output gear 53 is operatively coupled to driven gear 56 which is supported through the medium of a bearing 100 by drive case 73.

In the operation of the present invention, the left end of member 84 axially extending from ring gear 32 is engageable with the right end of member 83 axially extending from carrier 45, so that if a pitch diameter of such gear or a helix angle thereof is properly determined, a thrust of planetary gear system 16 and that of planetary gear system 41 internally counterbalance each other, and hence a reacting force need not be received by the cases 73 and 74. Therefore, a thrust washer or bearing is no longer needed, resulting in a less costly device as well as the improved reliability in performance of the device.

Output gear 53 and ring gear 44 of planetary gear system 41 are connected to each other by means of splines, wherein the relative rotation in the axial direction of these gears is restricted, and the relative movement in the axial direction of one gear to another is also restricted by stopper ring 95. Consequently, a thrust by a helix angle of output gear 53 and that by a helix angle of ring gear 44 of planetary gear system 41 counterbalance each other, thus only exerting a reduced load on the bearings and the cases, resulting in the improved endurance of these members.

Sun gear 42 of planetary gear system 41 engages carrier 45 through the medium of washer 103, and the opposing ends of carrier 45 and ring gear 32 of planetary gear system 16 are maintained in engagement with each other. By such arrangement, a thrust created by a helix angle of sun gear 42 of planetary gear system 41 and that by a helix angle of ring gear 32 of planetary gear system 16 counterbalance each other, so that a reduced load is exerted on the bearings and the cases, resulting in the improved durabiity of these members.

In the case where the overdrive unit is so arranged that a one-way clutch is provided between carrier 45 serving as an input element of the overdrive unit and output gear 53 serving as an output element, and at the direct drive of the overdrive device, the driving force is transmitted from the carrier by way of the one-way clutch directly to the output gear 43, rather than by way of the planetary gear system 41, then no thrust is created even when the one-way clutch is brought into an engagement position, with the failure to offset a thrust in planetary gear system 16 in underdrive unit 12. In contrast thereto, in the arrangements according to the present invention, a thrust which originates from planetary gear system 16 and the thrust of a helical gear (output gear) 53 conveyed through ring gear 44 and sun gear 42 of planetary gear system 41 is counterbalanced upon engagement of one-way clutch 54. Stated otherwise, a thrust originating from ring gear 44 or sun gear 42 is transmitted by way of washer 103 to carrier 45, and by the engagement of carrier 45 with ring gear 32, the thrusts in both planetary gear systems counterbalance each other. Thus if the pitch diameter of each gear or a helix angle thereof is properly determined, the thrust of one gear and that of another gear internally counterbalance each other. In place of one-way clutch 54, a one-way clutch 108 may be provided between sun gear 42 and carrier 45 in the manner shown in FIG. 3, with the same results as the one-way clutch 54.

In the illustrated arrangements, two or more bearings 87, 96 and 97 are mounted on carrier 45 along the outer periphery thereof in a manner that output gear 53 and drive case 73 are supported by at least a single bearing, respectively. In the depicted embodiment, bearing 87 supports drive case 73 and bearings 96 and 97 support output gear 53. Bearings 96 and 97 receive a thrust, and a reacting force by these bearings is received by way of bearings 87 and 88 by drive case 73 and auxiliary case 74, respectively. In the embodiment, the reacting force of tooth load on output gear 53 is received by two bearings 87 and 88 so as to reduce a moment load due to thrust load.

A differential rotation between output gear 53 and carrier 45 arises only at the overdrive range. The difference in rotation therebetween is extremely small. For example, assuming that i is representative of an overdrive gear ratio, and n is representative of an r.p.m. of carrier 45, then the rotation difference is $(1-i)n$. This value is small. A torque transmitted to output gear 53 is as small as iT, where T is the input torque of carrier 45. This permits bearings 96 and 97 to be of a small capacity. The outer races of bearing 87 and drive case 73 are rigidly secured to each other by means of stopper ring 109.

Preferably, a plurality of bearings 87, 96 and 97 are mounted on carrier 45, which in turn is fitted by means of splines 82 to intermediate shaft 40 of underdrive unit 12. This spline-fitting facilitates adjustment of preload on bearings 96 and 97 by means of nut 98 and provides ease of assembly. Intermediate shaft 40 is preferably of a rod shape to reduce manufacturing cost. Since eccentricity of the members for supporting the outer races of bearings 87, 96 and 97 (drive case 73 and output gear 53 in the embodiment) relative to intermediate shaft 40 is absorbed by the spline-fitting therebetween, there results an improved endurance of these members as well as reliability in performance thereof. Eccentricity of pinions 43 supported by carrier 45 relative to intermediate shaft 40 is absorbed by the spline-fitting therebetween.

It will be apparent to those skilled in the art that various modifications and variations may be made in the elements of the invention without departing from the scope or spirit of the invention.

What is claimed is:

1. In a vehicular transmission having a fluid-type torque converter, an underdrive unit, including a planetary gear system, being adjacent and coaxial to and driven by the output means of said torque converter, an overdrive unit, including a planetary gear system, being adjacent and coaxial to and driven by the output means of said underdrive unit, and an intermediate shaft coaxially interconnecting said planetary systems, said planetary systems each including sun and ring gears, planetary pinions and a planetary carrier, the improvement comprising:

means on one element of the planetary gear system of said overdrive unit and means on one element of the planetary gear system of said underdrive unit engageably abutting each other in an axial direction for counterbalancing the thrusts of said planetary systems and for reducing forces acting on casings and bearings of said transmission, said counterbalancing means being splined to the outer peripheral surface of said intermediate shaft.

2. In the vehicular transmission of claim 1 wherein the output means of said overdrive unit is the ring gear of the overdrive planetary gear system and including an output gear coaxial with and axially disposed between the underdrive and overdrive units and being coupled with and driven by the ring gear of the overdrive planetary system, said output gear driving an output shaft substantially parallel to the axis of the torque converter for transmitting rotation of the wheels of said vehicle, the improvement further comprising:

means for interconnecting said ring gear of said overdrive planetary unit and said output gear including means for restricting relative axial movements and for counterbalancing the thrust of said ring gear and said output gear.

3. The vehicular transmission of claim 2 wherein said interconnecting means are meshed splines on said ring and output gears and said means for restricting relative axial movement and counterbalancing the gear thrusts is a stopper ring transversely engaging said ring gear and output gear at their coupled peripheral surfaces.

4. In the vehicular transmission of claim 1 wherein the improvement further comprises:

means for axially engaging said one element of the overdrive planetary gear system with another element of said overdrive planetary system for counterbalancing the thrust of said another element of the overdrive planetary gear system with the thrust transmitted through said one element of said overdrive planetary gear system from the planetary gear system of said underdrive unit.

5. The vehicular transmission of claim 4 wherein said another element of the overdrive planetary gear system is the sun gear and said one element of the overdrive planetary gear system is the planetary carrier through which the thrust of the underdrive planetary gear system is transmitted and the means for axially engaging said two elements of the overdrive planetary system is a washer axially disposed between and engaging the sun gear and the planetary carrier.

6. In a vehicular transmission having a fluid-type torque converter, an underdrive unit comprising first and second coaxial planetary gear systems, each having a sun gear, ring gear, pinion gears, and planetary carrier, input gear means of said first planetary system being driven by the output of said fluid-type torque converter and the planetary carrier of said first planetary system being operatively connected by an intermediate shaft to and driving the ring gear of said second planetary system, an overdrive unit comprising a third planetary gear system having a sun gear, ring gear, pinion gears and planetary carrier and being coaxial with said first and second planetary systems, the planetary carrier of said third planetary system being operatively connected by said intermediate shaft to and being driven by the ring gear of said second planetary system, an output gear axially disposed between said underdrive and overdrive units and being coupled to and driven by the ring gear of said third planetary system, and gear means for transmitting the output of said transmission, the improvement comprising:

a portion of the ring gear of said second planetary gear system extending axially along the outer periphery of said intermediate shaft and a portion of the planetary carrier of said third planetary gear system extending axially along the outer periphery of said intermediate shaft and said portions being splined to the outer peripheral surface of said intermediate shaft and engageably abutting each other in an axial direction for counterbalancing the thrust of said second and third planetary gear systems.

7. In the vehicular transmission of claim 6 wherein the improvement further comprises a stopper ring transversely engaging the coupled peripheral surfaces of the ring gear of said third planetary gear system and said output gear for restricting relative axial movement of said gears and for counterbalancing the thrust of said overdrive ring gear and said output gear.

8. The vehicular transmission of claim 6 wherein a washer is interposed between and engages the sun gear and the planetary carrier of said third planetary gear system for counterbalancing the thrust of said sun gear and the thrust of said second planetary gear system communicated through said third planetary carrier.

9. A compact transmission for an engine-driven vehicle, the crank shaft of said engine driving said transmission the output of which drives the wheels of said vehicle, the transmission comprising:
(a) a fluid-type torque converter coaxial with and driven by the crank shaft of said engine;
(b) an underdrive unit having an axial input shaft coaxially coupled to and driven by said torque converter, said underdrive unit comprising a planetary gear system including an input gear means driven by said input shaft and an output gear means and an intermediate shaft coupled to and driven by the underdrive output gear means;
(c) an overdrive unit comprising a planetary gear system including an input gear means and an output gear means, said input gear means being coaxially coupled to and driven by said intermediate shaft;
(d) axial extension member means integral with said underdrive output gear means and with said overdrive input gear means for placing said underdrive output and overdrive input gear means in axial engageable contact to counterbalance the thrusts of said planetary gear systems;
(e) washer means axially disposed between said overdrive input gear means and another element of said overdrive planetary system for counterbalancing the thrust of said overdrive planetary system against the thrust of said underdrive planetary system conveyed through said extension member means and overdrive input gear means; and
(f) gear means operatively coupled with the output gear means of said overdrive unit for transmitting the output of said overdrive unit to the wheels of said vehicle.

10. The transmission of claim 9 wherein said underdrive unit comprises first and second coaxial, operatively interconnected planetary gear systems each having sun and ring gears, planetary pinions and a planetary carrier, said first planetary system being proximate said torque converter, the first planetary system ring gear being said underdrive input gear means and the second planetary system ring gear being said underdrive output gear means, and wherein said overdrive unit comprises a third planetary gear system having sun and ring gears, planetary pinions, and a planetary carrier, said third planetary system planetary carrier being said overdrive input gear means and said third planetary system ring gear being said overdrive output gear means.

11. The transmission as in claim 10 wherein said extension member means is an axial extension member integral with the ring gear of said second planetary gear system and an axial extension member integral with the planetary carrier of said third planetary gear system, said extension members being proximate the periphery of said intermediate shaft and engageably abutting each other in an axial direction.

12. The transmission as in claim 10 wherein said another element of said overdrive planetary system is the third planetary system sun gear and said washer means is a washer axially interposed between and engaging the sun gear and planetary carrier of said third planetary gear system.

13. The transmission of claim 10 including transmitting gear means comprising an output gear axially interposed between said underdrive and overdrive units and being coupled to and driven by the ring gear of said overdrive planetary unit, a stopper ring transversely engaging the peripheral surfaces of the coupled overdrive planetary ring and output gears for restricting relative axial movement of said gears and for counterbalancing the thrusts of said overdrive ring gear and said output gear, a transmission output unit, and a final reduction gear, said output unit and final reduction gear conveying the rotation of said output gear to the axles of said vehicle.

14. A compact transmission for a vehicle having a transversely mounted engine, the crank shaft of said engine being parallel to the vehicle axles and driving said transmission the output of which drives the wheels of the vehicle, the transmission comprising:
(a) a fluid-type torque converter coaxial with and driven by the crank shaft of said engine;
(b) an underdrive unit having an input shaft coaxially coupled to and driven by said torque converter, said underdrive unit comprising:
(1) a first planetary gear system having sun and ring gears, planetary pinions, and a planetary carrier, said input shaft being coupled to and driving said first planetary ring gear,
(2) an intermediate shaft coaxially driven by the planetary carrier of said first planetary gear system,
(3) a second planetary gear unit having sun and ring gears, planetary pinions, and a planetary carrier, said intermediate shaft being coaxially coupled to and driving said second planetary ring gear,
(4) a first axial extension member on said second planetary ring gear proximate the periphery of said intermediate shaft, and
(5) first hydraulically controlled clutch means for selectively engaging and disengaging elements of said first and second planetary gear units;
(c) an overdrive unit coaxially coupled to and driven by said intermediate shaft, comprising:
(1) a third planetary gear system having sun and ring gears, planetary pinions, and a planetary carrier, said intermediate shaft driving said third planetary carrier;
(2) a second axial extension member on said third planetary carrier proximate said intermediate shaft, said first and second extension members axially engageably abutting to counterbalance the thrust of said second planetary ring gear against the thrust of said third planetary carrier;

(3) a washer member axially interposed between and engaging said third planetary sun gear and said third planetary carrier, said washer member permitting counterbalance of the thrust of said third planetary sun gear against the thrust of said second planetary ring gear being conveyed through said third planetary carrier, and (4) second hydraulically controlled clutch means for selectively engaging and disengaging elements of said third planetary gear system;

(d) an output gear axially interposed between said underdrive and overdrive units, said output gear being coupled to and driven by the third planetary ring gear;

(e) a stopper ring transversely engaging the peripheral surfaces of the coupled third planetary ring and output gears for restricting relative axial movement of said gears and for counterbalancing the thrusts of said gears;

(f) an output unit comprising a driven gear, a driving gear and an output unit shaft, said shaft being substantially parallel to said intermediate shaft and rigidly interconnecting said driven and driving gears, said driven gear being meshed with and driven by said output gear; and (g) a final reduction gear being driven by said driving gear of said output unit and driving the wheels of said vehicle, said final reduction gear being proximate said torque converter.

15. In a vehicular transmission including coaxial underdrive and overdrive units, an intermediate shaft coaxially interconnecting said underdrive and overdrive units, and an output gear axially disposed between said units, each said unit having at least one planetary gear system including a sun gear, a ring gear, planetary pinions, and a planetary carrier and each said unit having an input element and an output element, the output element of said underdrive unit driving the input element of said overdrive unit and the output element of said overdrive unit driving said output gear, the improvement comprising:

first means integral with and axially extending in abutting relationship from each of said underdrive unit output element and overdrive unit input element for axially counterbalancing the internal thrusts of said planetary gear systems and for reducing forces acting on casings and bearings of said transmission, said first means being splined to the outer peripheral surface of said intermediate shaft.

16. The transmission of claim 15 also including third means preventing relative axial movement between said overdrive unit output element and said output gear for counterbalancing the thrust of said overdrive output element and said output gear.

17. The transmission of claim 15 wherein said driving output element of said underdrive unit is the ring gear of the underdrive planetary system and the driven input element of said overdrive unit is the planetary carrier of the overdrive planetary system.

18. The transmission of claim 15 also including second means axially disposed between and engaging said input driven element and another element of said overdrive unit for counterbalancing the thrust of said another element and the thrust of said underdrive unit conveyed through said overdrive input element.

19. The transmission of claim 18 wherein said second counterbalancing means is a washer member, said another overdrive element is the sun gear and the overdrive input driven element is the planetary carrier of the planetary system of said overdrive unit.

20. The transmission of claim 16 wherein said overdrive output element is the ring gear of the overdrive planetary system, said overdrive ring gear and output gear being operatively coupled, and wherein said third counterbalancing means is a stopper ring transversely engaging the coupled peripheral surfaces of said overdrive ring and output gears for counterbalancing the thrusts of said gears and restricting relative axial movement of said gears.

* * * * *